3,326,913
AZIDO TRIAZINES
Hermann Schulz and Werner Schwarze, Frankfurt am Main, Germany, assignors to Deutsche Gold- und Silber-Scheideanstalt vormals Roessler, Frankfurt am Main, Germany
No Drawing. Filed Oct. 8, 1964, Ser. No. 402,634
Claims priority, application Great Britain, June 8, 1962, 22,286/62; Mar. 13, 1963, 9,984/63; Germany, Sept. 15, 1962, D 39,855; Apr. 11, 1963, D 41,353; Apr. 13, 1963, 41,381; May 3, 1963, D 41,478
3 Claims. (Cl. 260—249.6)

This is a continuation-in-part of application Ser. No. 286,187, filed June 7, 1963, now abandoned.

The present invention relates to novel azido triazines of the formula

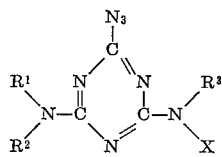

in which at least one of $R^1$ and $R^2$ is lower alkyl, lower alkenyl, cyano lower alkylene, lower alkoxy lower alkylene and the other is hydrogen, lower alkyl, lower alkenyl, cyano lower alkylene or lower alkoxy lower alkylene. Preferably, $R^2$ is lower alkyl and $R^1$ is hydrogen or lower alkyl, $R^3$ is hydrogen, lower alkyl, lower alkenyl, cyano lower alkylene or lower alkoxy lower alkylene and X is hydrogen, lower alkyl, lower alkenyl, cyano lower alkylene, lower alkoxy lower alkylene, —$CONR^4R^5$, —$SO_2NR^4R^5$, —$SO_2R^6$, —$PO(NR^4R^5)$ or —$PS(NR^4R^5)_2$ in which each of $R^4$ and $R^5$ is hydrogen or lower alkyl and $R^6$ is lower alkyl, at least one of $R^3$ and X being other than hydrogen, $R^3$ preferably being hydrogen and X being lower alkyl, and their use as herbicides.

The following are the preferred, 2,4-bis lower alkyl amino-6-azido-s-triazines:

2-methylamino-4-t-butylamino-6-azido-s-triazine
2-ethylamino-4-t-butylamino-6-azido-s-triazine
2,4-bis-isopropylamino-6-azido-s-triazine
2-methylamino-4-i-butylamino-6-azido-s-triazine
2-methylamino-4-t-amylamino-6-azido-s-triazine
2-ethylamino-4-t-amylamino-6-azido-s-triazine
2-ethylamino-4-i-propylamino-6-azido-s-triazine which are particularly effective for control of weeds in corn, cotton and broad bean crops when applied as a preemergence soil spray.

The compounds according to the invention can be produced in various ways, such as, for example, by reacting the quaternary salts of the corresponding triazine derivatives with ammonium azide or alkali metal azides. Such quaternary ammonium salts, for example, can be prepared as described in Austrian Patent No. 174,377.

The substituent —$NR^1R^2$ can be introduced into the triazine ring by procedures known per se. The substituent

can be introduced into the triazine ring in a number of ways depending upon the type of substituent concerned. For example, a chlorinated triazine can be reacted with a diamino sulfone in the presence of an organic solvent and a basic substance at moderate temperatures. Also, for example, the X substituent can be introduced into an

substituent by treatment with $ClCONR^4R^5$ or $ClSO^2R^6$ or with $POCl_3$ or $PSCl_3$ followed by reaction with ammonia or a primary or secondary lower alkyl amine.

The compounds according to the invention can be used for the extermination or selective suppression of weeds among cultivated plants or also for completely killing and preventing undesirable plant growth. In certain circumstances, they can also be used as plant growth regulating agents, for example, for defoliation, or reducing the amount of fruit which is set or for retarding blossoming. As well as influencing living plants, these compounds can also be used for sterilizing the soil. They can be used as such or in admixture with one another, or in admixture with other herbicides or with fungicides, insecticides or fertilizers.

Most of the compounds claimed are crystalline solid substances but some oily which are difficult to crystallize. Most of them are insoluble or only sparingly soluble in water, but on the other hand many have good solubility in organic solvents.

The following are examples of solvents for the triazine compounds: alcohols, ketones, hydrocarbons such as toluene, halogenated hydrocarbons such as chloronaphthalene, mineral oils such as diesel oil, vegetable oils or mixtures of the said substances.

The triazine compounds of the invention can be applied by known methods which are familiar to any expert in this field, the choice of the method depending on existing circumstances and the properties of the herbicide. The known formulations can generally be used for this purpose.

For example, more or less concentrated solutions in organic solvents can be prepared and these are further diluted with these solvents prior to use.

The solutions in solvents which are miscible with water can be mixed with water. The triazine compounds then precipitate in solid or liquid form. These suspensions or emulsions can be stabilized by known substances.

The triazine compounds can also be used on solid carriers and as such, all those known for this purpose can be employed, for example, clay, kaolin, kieselguhr, bentonite, talcum, finely ground calcium carbonate, wood charcoal, sawdust and soya bean flour.

The active substances can be mixed in dry form with the carriers. However, solutions or emulsions can also be sprayed on to the carrier or mixed with the latter, the mixture then being dried.

In order to achieve a better adhesion of the active substance to the carriers, known adhesives, "stickers," such as size, casein, alginates and similar substances can be employed.

Finally, the triazine compounds, if desired together with the carrier substances, can be mixed with suspension agents and stabilizers, for example, to form a paste, or processed to give a powder, and these latter can then be stirred with water to form a suspension.

Examples of suitable wetting agents, emulsifiers and stabilizers are known anionic, cationic or non-ionic substances, for example, Turkey red oil, salts of fatty acids, alkyl oxide sulphonates, secondary alkyl sulphates, resinic acid salts, polyoxyethylene ethers of fatty alcohols, fatty acids or fatty amines, quaternary ammonium compounds, lignin-sulphonic acid, saponin, gelatine, casein, by themselves or in admixture with one another.

The following examples will serve to illustrate several embodiments of the invention.

*Example 1*

72 g. of 2,4-bis-isopropylamino-triazinyl-6-trimethyl ammonium chloride were dissolved in 500 ml. of water and 32.5 g. of sodium azide were added thereto while stirring without heating. A thick precipitate was formed and this quickly crystallized. After standing for 1 hour, the mixture was suction-filtered, washed and dried in vacuo. 51 g. of 2,4-bis-isopropylamino-6-azido-triazine of the formula

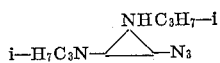

were obtained as a white crystalline powder with a melting point of 94 to 95° C.

*Analysis.*—$C_9H_{18}N_8$ (mol weight 236) Calculated: C, 45.7; H, 6.8; N, 47.5. Found: C, 45.6; H, 7.2; N, 47.0

Example 2

27.45 g. of 2-methylamino-4-t-butylamino-triazinyl-6-trimethyl ammonium chloride were dissolved in 150 cc. of methanol and 7 g. of sodium azide added thereto and the mixture heated for two hours at 40–50° C. The methanol was then distilled off under vacuum and the smeary residue stirred into a paste with water whereupon the residue soon crystallized. The crystals were filtered off on a suction filter, washed and dried. 20.4 g. of white crystals (91.2% of theory) of a melting point of 110–111° C. were obtained.

Analogously, the following azido triazines were prepared in good yields from the corresponding triazinyl-trimethyl ammonium chlorides:

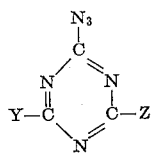

| Y | Z | M.P., °C. | Appearance |
|---|---|---|---|
| $C_2H_5NH-$ | $t-C_4H_9NH-$ | 94–95 | White crystals. |
| $CH_3NH-$ | $i-C_4H_9NH-$ | 67–68 | Do. |
| $CH_3NH-$ | $t-C_5H_{11}NH-$ | 87–88 | Do. |
| $C_2H_5NH-$ | $t-C_5H_{11}NH-$ | 73–74 | Do. |
| $C_2H_5NH-$ | $i-C_3H_7NH-$ | 62.5–63.5 | Do. |
| $CN-CH_2-NH-$ | $CN-CH_2-NH-$ | 203 | Do. |
| $CN-CH_2-NH-$ | $t-C_4H_9NH-$ | 167–168 | Do. |
| $CH_3O(CH_2)_3-NH-$ | $C_2H_5NH-$ | 80 | Do. |
| $CH_3O(CH_2)_3-NH-$ | $CH_3O(CH_2)_3-NH-$ | 79–80 | Do. |
| $CH_2=CH-CH_2\cdot NH$ | $i-C_3H_7NH-$ | 49–50 | Do. |
| $(C_2H_5)_2N-$ | $C_2H_5NH-$ | 110–120 | Do. |
| $(C_2H_5)_2N-$ | $(C_2H_5)_2N-$ | Oil | Oil. |
| $C_2H_5NH-$ | $C_2H_5NH-$ | 103–104 | White crystals. |
| $CH_3NH$ | $i$-butyl-$NH-$ | 65–68 | Do. |
| $CH_3NH$ | $t$-amyl-$NH-$ | 87–88 | Do. |
| $C_2H_5NH-$ | $t$-amyl-$NH-$ | 73–84 | Do. |
| $C_2H_5NH-$ | $i$-propyl-$NH-$ | 63–64 | Do. |

Example 3

16.6 g. of 2 - (N - carbamoyl - N - i-propyl)-amino-4-i-propylamino-1,3,5-triazine-6-yl-trimethyl ammonium chloride were dissolved in 100 cc. of water and 3.6 g. of sodium azide added thereto. After permitting the reaction mixture to stand for 3 hours, the white crystals which had precipitated out were filtered off on a suction filter, washed and dried. 10.65 g. of 2-(N-carbamoyl-N-i-propyl) amino - 4 - i-propylamino-6-azido-triazine with a melting point of 151° C. were obtained—

*Analysis.*—Found: C, 43.2%; H, 6.4%; N, 45.3%. Calculated for $C_{10}H_{17}N_9O$ (M=279): C, 43.1%; H, 6.1%; N, 45.2%.

The same reaction can also, for example, be carried out in formamide.

Example 4

46.1 g. of 2-(N-dimethylaminosulfonyl-N-ethyl)-amino-4 - ethylamino - 1,3,5 - triazine-6-yl-trimethyl ammonium chloride were dissolved in 200 cc. of water and 9.7 g. of sodium azide added thereto. After the reaction mixture had been permitted to stand for 8 hours at room temperature, the thick white crystalline paste which had formed was suction filtered, washed and dried. 30 g. of 2-(N-dimethyl - aminosulfonyl-N-ethyl)-amino-4-ethylamino-6-azido-s-triazine with a melting point of 130° C. were obtained.

Example 5

35.25 g. of 2-(N-methylsulfonyl-N-ethyl)-amino-4-i-propylamino-1,3,5-triazine-6-yl-trimethyl ammonium chloride were dissolved in 200 cc. of water and 7.5 g. of sodium azide dissolved in 30 cc. of water added thereto. After the reaction had completed the precipitated product was separated off and dried. 23.9 g. of 2-(N-methylsulfonyl-N-ethyl)-amino - 4 - i - propylamino - 6 - azido-s-triazine of a smeary consistency and difficult to crystalize completely was obtained.

Example 6

35.25 g. of 2-i-propylamino-4-(N-diaminophosphinyl-N - ethyl)-amino-1,3,5-triazine-6-yl-trimethyl ammonium chloride were reacted with 8 g. of sodium azide in water at 20° C. 24 g. of 2-i-propyl-4-(diaminophosphinyl-N-ethyl)-amino-6-azido-s-triazine were obtained as white crystals with a melting point of 128–130° C.

Example 7

23.6 g. of 2-ethylamino-4-t-butylamino-6-azido-triazine were boiled with 125 cc. of $POCl_3$ for 24 hours under reflux. The excess $POCl_3$ was then evaporated off. 35.1 g. of 2 - (N - dichlorophosphinyl-N-ethyl)-amino-4-t-butyl-amino-6-azido-s-triazine remained as the residue.

35.3 g. of the dichlorophosphinyl compound prepared as above were dissolved in 150 cc. of toluene and gaseous ammonia introduced into such solution at 0–20° C. When the solution was saturated with $NH_3$ the gas stream was shut off and the reaction mixture stirred for several hours at room temperature. The precipitated product was filtered off, washed with ligroin for a short while, dried, and then washed chlorine free with water and dried again. 26.3 g. of 2-(N-diamino-phosphinyl-N-ethyl)-amino-4-t-butyl-amino-6-azido-s-triazine of a melting point of 150–151° C. were obtained as white crystals.

*Analysis.*—Calculated for $C_9H_{19}N_{10}PO$: N, 44.6%; P, 9.88%. Found: N, 44.45%; P, 9.71%.

The corresponding thioyl compound was obtained in an analogous manner by using phosphorus sulfochloride instead of phosphorus oxychloride for reaction with the starting compound.

In the following examples the proportions of the compositions are given in parts by weight.

Example 8

25 parts of 2-azido-4-t-butylamino - 6 - (N - dimethyl-amino-sulfonyl-N-methylamino)-s-triazine were dissolved in 65 parts of xylene. 5 parts of an ethoxylated fatty alcohol were then added. On stirring into water, stable emulsions were formed.

Example 9

A mixture of 10 parts of 2-(N-carbamoyl-N-i-propyl)-amino-4-i-propylamino-6-azido-triazine and 90 parts of kieselguhr were ground in a ball mill until it had the fineness required of a dusting powder. The resulting dusting powder possessed excellent herbicidal action.

The active ingredient in such dusting powder can be replaced by:

2-(N-methylcarbamoyl-N-ethyl)-amino-4-t-butylamino-6-azido-s-triazine or 2-(N-dimethylaminosulfonyl-N-ethyl)-amino-4-ethyl-amino-6-azido-triazine.

Example 10

10 parts of 2-(N-dimethylaminosulfonyl - N - ethyl)-amino-4-ethylamino-6-azido-triazine were mixed with 290 parts of talcum and ground to dusting powder fineness. The mixture can be used as such as a dusting powder but to increase its adherence to leaves it was found advantageous to mix in 1 part of gelatin.

The active ingredient in such dusting powder can be replaced by:

2-(N-ethylsulfonyl-N-methyl)-amino-4-t-butylamino-6-azido-s-triazine.

Example 11

10 parts of 2-(N-methylsulfonyl-N-ethyl)-amino-4-i-propylamino-6-azido-s-triazine were dissolved in a mixture of 10 parts of cyclohexanone, 20 parts xylene and 10 parts of a polyoxyethylene ether of a fatty alcohol as a surface active agent. The resulting homogeneous mixture upon being mixed with water gave stable emulsions.

Example 12

10 parts of 2-i-propylamino-4-(N-diaminophosphinyl-N-ethyl)-amino-6-azido-s-triazine were ground with 90 parts of talcum in a ball mill to produce a dusting powder.

Example 13

10 parts of 2-(N-diaminothiophosphinyl-N-ethyl)-amino-4-ethyl-amino-6-azido-s-triazine were dissolved in a mixture of 10 parts of cyclohexanone, 20 parts of xylene and 10 parts of a polyethylene glycol ether of a fatty alcohol, as a surfactant. The resulting homogeneous mixture produced stable emulsions upon admixture with water.

We claim:

1. A triazine compound of the formula

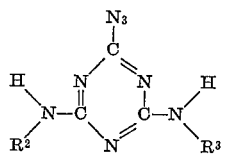

wherein each of $R^2$ and $R^3$ is lower alkyl.

2. 2-ethylamino-4-t-butylamino-6-azido-s-triazine.

3. A process for the production of a triazine of the formula

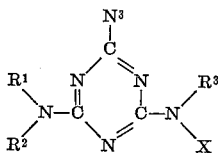

in which each of $R^1$, $R^2$ and $R^3$ is selected from the group consisting of hydrogen and lower alkyl and X is selected from the group consisting of hydrogen, lower alkyl, $-SO_2-NR^4R^5$, $-SO_2R^6$, $-PO-(NR^4R^5)_2$,
$-PS-(NR^4R^5)_2$ and $-CONR^4R^5$ wherein each of $R^4$ and $R^5$ is selected from the group consisting of hydrogen and lower alkyl and $R^6$ is lower alkyl, which comprises reacting a quaternary ammonium compound of the formula

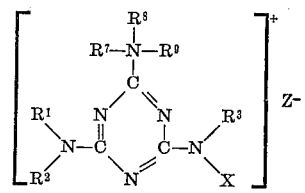

wherein $R^1$, $R^2$, $R^3$ and X have the same significance as above, each of $R^7$, $R^8$ and $R^9$ is lower alkyl and Z is an acid radical with a salt selected from the group consisting of ammonium azide and alkali metal azides.

References Cited

UNITED STATES PATENTS

2,909,420  10/1959  Gysin et al. _____ 260—249.9 X

OTHER REFERENCES

Hart J.: Am. Chem. Soc., vol. 50 (1928) pp. 1922–1930.

Smolin et al.: "s-Triazines and Derivatives," Interscience Pub. Inc., New York, (1959) pp. 100–104.

WALTER A. MODANCE, *Primary Examiner.*

JOHN D. RANDOLPH, *Examiner.*

J. M. FORD, *Assistant Examiner.*